US011289930B2

(12) United States Patent
Reed

(10) Patent No.: US 11,289,930 B2
(45) Date of Patent: Mar. 29, 2022

(54) POWER TOOL, BATTERY PACK, AND COMBINATION, AND METHOD OF CONTROLLING THE SAME

(71) Applicant: TTI (Macao Commercial Offshore) LIMITED, Macau (MO)

(72) Inventor: Brett Reed, Alliance, OH (US)

(73) Assignee: Techtronic Floor Care Technology Limited, Tortola (VG)

( * ) Notice: Subject to any disclaimer, the term of this patent is extended or adjusted under 35 U.S.C. 154(b) by 501 days.

(21) Appl. No.: 16/170,884

(22) Filed: Oct. 25, 2018

(65) Prior Publication Data

US 2019/0067971 A1 Feb. 28, 2019

Related U.S. Application Data

(63) Continuation of application No. 15/509,462, filed as application No. PCT/US2016/050030 on Sep. 2, 2016, now Pat. No. 10,148,111.
(Continued)

(51) Int. Cl.
*H02J 7/00* (2006.01)
*A47L 5/36* (2006.01)
(Continued)

(52) U.S. Cl.
CPC .............. *H02J 7/0063* (2013.01); *A47L 5/26* (2013.01); *A47L 5/365* (2013.01); *A47L 9/0477* (2013.01);
(Continued)

(58) Field of Classification Search
CPC .......... A47L 5/26; A47L 5/365; A47L 9/0477; A47L 9/2831; A47L 9/2842;
(Continued)

(56) References Cited

U.S. PATENT DOCUMENTS 5,850,134 A * 12/1998 Oh .................. H01M 10/42
320/106
7,176,654 B2 2/2007 Meyer et al.
(Continued)

FOREIGN PATENT DOCUMENTS

CN 2229791 6/1996
CN 2246484 2/1997
(Continued)

OTHER PUBLICATIONS

The Engineering Tool Box—AWG Wire Gauge Current Ratings—provides common knowledge electrical properties of prior art wire. (Year: 2020).*
(Continued)

Primary Examiner — Marc Carlson
(74) Attorney, Agent, or Firm — Michael Best & Friedrich LLP

(57) ABSTRACT

A battery pack, power tool, and power tool combination. The battery pack includes one or more battery cells, a first terminal electrically connected to the one or more battery cells, a high current power supply terminal, a power switch electrically connected between the one or more battery cells and the high current power supply terminal, and a low current power supply terminal electrically connected to the one or more battery cells. The first terminal and low current power supply terminal are operable to provide a substantially continuous low current to the power tool during a normal operating state of the battery pack. The battery pack also includes a controller operable to control the power switch to provide high current power through the high current power supply terminal in response to a call for power from the power tool.

15 Claims, 15 Drawing Sheets

Related U.S. Application Data

(60) Provisional application No. 62/213,569, filed on Sep. 2, 2015.

(51) Int. Cl.

| | | |
|---|---|---|
| *H01M 2/10* | (2006.01) | |
| *A47L 9/28* | (2006.01) | |
| *A47L 5/26* | (2006.01) | |
| *H01M 10/48* | (2006.01) | |
| *H01M 10/42* | (2006.01) | |
| *A47L 9/04* | (2006.01) | |
| *H01M 50/20* | (2021.01) | |

(52) U.S. Cl.
CPC ........... *A47L 9/2831* (2013.01); *A47L 9/2842* (2013.01); *A47L 9/2847* (2013.01); *A47L 9/2857* (2013.01); *A47L 9/2884* (2013.01); *A47L 9/2894* (2013.01); *H01M 10/4257* (2013.01); *H01M 10/482* (2013.01); *H01M 50/20* (2021.01); *H02J 7/00* (2013.01); *H02J 7/0026* (2013.01); *H02J 7/0029* (2013.01); *H02J 7/0042* (2013.01); *H01M 2010/4271* (2013.01); *H01M 2200/103* (2013.01); *H01M 2220/30* (2013.01); *H02J 7/0047* (2013.01); *H02J 7/0048* (2020.01); *H02J 7/00306* (2020.01); *H02J 2007/0067* (2013.01); *Y02B 40/00* (2013.01)

(58) Field of Classification Search
CPC .... A47L 9/2847; A47L 9/2857; A47L 9/2884; A47L 9/2894; H01M 10/4257; H01M 10/482; H01M 2010/4271; H01M 2200/103; H01M 2220/30; H01M 2/1022
See application file for complete search history.

(56) References Cited

U.S. PATENT DOCUMENTS

| | | | | |
|---|---|---|---|---|
| 7,270,910 B2 * | 9/2007 | Yahnker | ............... | H01M 10/633 429/62 |
| 7,719,234 B2 | 5/2010 | Carrier et al. | | |
| 7,897,277 B2 * | 3/2011 | Meyer | ............... | F21S 6/003 429/100 |
| 8,148,946 B2 * | 4/2012 | Takeda | ............... | H01M 10/486 320/134 |
| 8,237,404 B2 * | 8/2012 | Takano | ............... | H01M 10/441 320/114 |
| 8,436,584 B2 * | 5/2013 | Johnson | ............... | H01M 4/505 320/132 |
| 8,742,724 B2 * | 6/2014 | Suzuki | ............... | H01M 10/482 320/132 |
| 2001/0017531 A1 * | 8/2001 | Sakakibara | ......... | H02J 7/00036 320/106 |
| 2005/0073282 A1 * | 4/2005 | Carrier | ............... | H01M 10/482 320/106 |
| 2006/0091858 A1 * | 5/2006 | Johnson | ............... | H01M 50/213 320/128 |
| 2010/0181966 A1 * | 7/2010 | Sakakibara | ......... | H01M 10/482 320/136 |
| 2010/0190052 A1 * | 7/2010 | Rajani | ............... | H01M 10/4257 429/178 |
| 2011/0163723 A1 * | 7/2011 | Tan | ............... | H02J 7/0029 320/134 |
| 2013/0244070 A1 | 9/2013 | Johnson et al. | | |
| 2014/0101887 A1 * | 4/2014 | Reed | ............... | A47L 9/2857 15/339 |
| 2016/0064776 A1 * | 3/2016 | Ro | ............... | H01M 10/48 429/61 |
| 2016/0204475 A1 * | 7/2016 | White | ............... | H02P 29/032 429/97 |
| 2017/0222454 A1 * | 8/2017 | Bakker | ............... | H01M 10/46 |
| 2019/0246858 A1 * | 8/2019 | Karasikov | ............... | B25J 5/007 |

FOREIGN PATENT DOCUMENTS

| | | |
|---|---|---|
| CN | 2277737 | 4/1998 |
| CN | 101756677 | 6/2010 |
| CN | 201602716 | 10/2010 |
| CN | 203763002 | 8/2014 |
| EP | 0528478 | 2/1993 |
| WO | 2010088244 | 8/2010 |

OTHER PUBLICATIONS

European Patent Office Examination Report for Application No. 16770119.2 dated Jul. 17, 2020 (4 pages).
Chinese Patent Office Action for Application No. 201680050971.4 dated Jul. 3, 2020 (7 pages including statement of relevance).
International Search Report and Written Opinion for Application No. PCT/US2016/050030 dated Nov. 14, 2016 (11 pages).

* cited by examiner

POWER TOOL, BATTERY PACK, AND COMBINATION, AND METHOD OF CONTROLLING THE SAME

RELATED APPLICATIONS

This application is a continuation of U.S. patent application Ser. No. 15/509,462, which entered the national stage on Mar. 7, 2017 as a 35 U.S.C. § 371 national stage entry of PCT Application PCT/US2016/050030, filed Sep. 2, 2016, which claims the benefit of U.S. Provisional Patent Application No. 62/213,569, filed Sep. 2, 2015, the entire contents of all of which are hereby incorporated by reference.

BACKGROUND

The invention relates to power tools, such as suction force cleaning systems, having processors, means for powering the power tools with multiple currents, and methods of controlling the power tools.

Suction force cleaning systems (hereinafter referred to as, simply, cleaning systems) include a wide range of products designed to meet a wide variety of cleaning needs. Examples of cleaning systems include stick-type vacuums, lightweight upright vacuums, hand-held vacuums, carpet cleaners, canister vacuums, and backpack vacuums.

Some cleaning systems utilize a first motor coupled to an agitator, such as a brush, along with a second motor coupled to an air mover. Commonly, the first motor, or brush motor, rotates the brush to agitate the cleaning surface. As the brush motor rotates the brush, the second motor, or suction motor, rotates the air mover to gather the debris exposed by the brush. Example air movers include a fan or impeller.

SUMMARY

The brush operating at a high speed on hard cleaning surfaces, such as hard wood floors, can scatter the debris away from the cleaning system before the debris is gathered through the use of the suction motor. Therefore, it is common for a cleaning system to turn the agitator off while cleaning hard surfaces. A three position switch can be used to switch between turning ON a suction motor only, turning ON both the suction motor and the brush motor, and turning OFF the motors.

For greater mobility, some cleaning systems are powered through the use of a battery pack. Typically, the battery pack only supplies power when a user controls the three-position switch to one of the ON states. However in some embodiments, additional functionality for the cleaning system may be available if the battery pack provides a low-current power while the three-position switch is in an OFF state.

Moreover, with high current surges from the battery pack to the cleaning system, a microcontroller may have difficulties deciphering a digital signal. In some embodiments, a coupling circuit can be used to help distinguish logic zeros from logic ones, even during high current use by the cleaning system.

In one embodiment, the invention provides a battery pack for a power tool. The battery pack includes one or more battery cells, a first terminal electrically connected to the one or more battery cells, a high current power supply terminal, a power switch electrically connected between the one or more battery cells and the high current power supply terminal, and a low current power supply terminal electrically connected to the one or more battery cells. The first terminal and low current power supply terminal are operable to provide a substantially continuous low current to the power tool during a normal operating state of the battery pack. The battery pack also includes a controller operable to control the power switch to provide high current power through the high current power supply terminal in response to a call for power from the power tool.

In another embodiment, the invention provides a power tool connectable to a battery pack. The battery pack includes a first terminal, a first high current power supply terminal, a first low current power supply terminal, and a first control terminal. The power tool includes a second terminal electrically connectable to the first terminal of the battery pack, a second high current power supply terminal electrically connectable to the first high current power supply terminal of the battery pack, a second low current power supply terminal electrically connectable to the first low current power supply terminal of the battery pack, and a second control terminal electrically connectable to the first control terminal of the battery pack. The power tool also includes a motor, a power circuit, a user interface, and a controller. The operation of the motor is based on a high current provided through the second high current power supply terminal. The power circuit is electrically connected to the second terminal and the second low current power supply terminal. The power circuit is operable to provide a power based on a substantially continuous low current provided through the second low current power supply terminal. The controller is connected to the power circuit, the user interface, and the second control terminal. The controller is operable to be powered by the power from the power circuit and to provide a call for power to the battery pack over the second control terminal based on a signal received from the user interface.

In another embodiment, the invention provides a method of operating a power tool electrically connected to a battery pack. The method includes receiving a substantially continuous low current from the battery pack, powering a microcontroller based on the substantially continuous low current, receiving, from a user interface of the power tool, an input related to the power tool performing a cleaning function, waking the microcontroller in response to the input, communicating a signal to the battery pack to receive a high current from the battery pack, and receiving the high current from the battery pack based on the signal.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Reference is made to digital signals (e.g., a logic one (or "one") or a logic high voltage; or a logic zero (or "zero") or a logic low voltage) that represent corresponding voltages for a specified time duration as recognized by one skilled in the relevant art. For example, the logic high voltage represents a nominal 1.5 volts (V), 1.8V, 2.5V, 3.3V, and 5V; and the logic low voltage represents a nominal 0V or ground.

This description provides an overview of various components and configurations that can be used to provide a low current power supply circuit, a pinch off circuit, a circuit for limiting ground shifts, and a circuit for communication. The terms "circuit," "cell," "block," "module," and "submodule" may be used interchangeability for a circuit with one or more components that provides a specified function, unless otherwise stated. A system may include one or more circuits. The terms "path," "channel" and "line" refer to a physical transmission medium between, across, or through components, circuits, or systems, such as a conductive line, wire, pin, signal trace, or other coupling between or through electrical components, circuits, or systems. The phrases "data channel" and "communication link" may be used interchangeability for a means by which data is transmitted. A data message or communication message is transmitted on the data channel. The data channel can be a data line or data bus.

Other aspects of the invention will become apparent by consideration of the detailed description and accompanying drawings.

BRIEF DESCRIPTION OF THE DRAWINGS

FIG. 7 also illustrates a block diagram for the electrical components of a battery pack and a battery charger.

DETAILED DESCRIPTION

Figure 1:
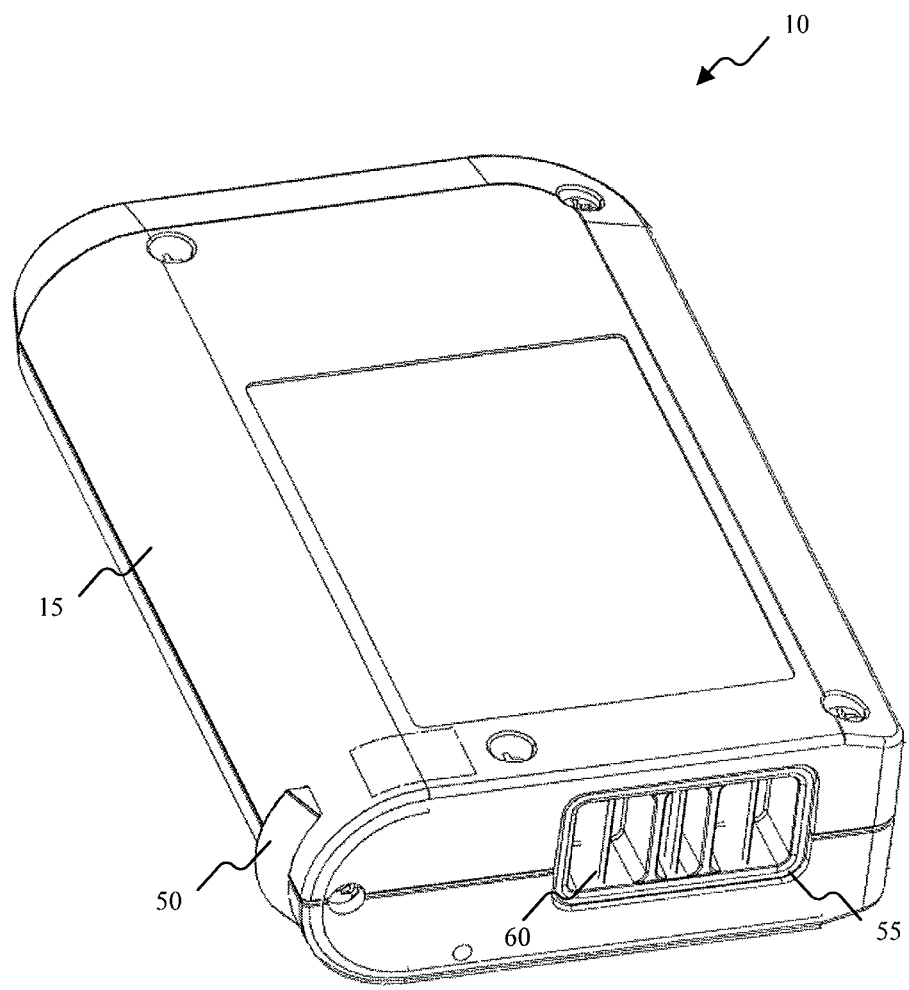
FIG. 1 illustrates a perspective view of a battery pack.
Figure 4:
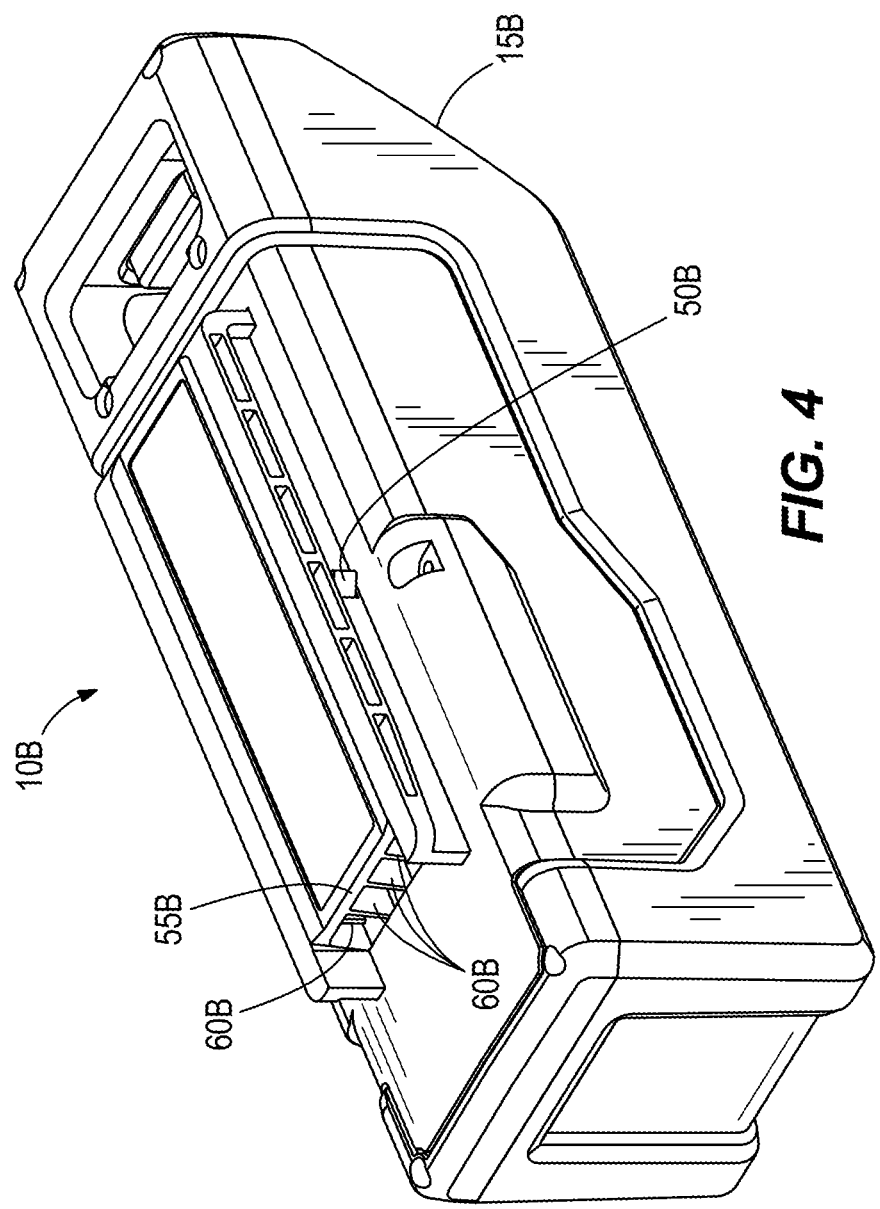
FIG. 4 illustrates a perspective view of a second battery pack.

FIG. 1 illustrates a first battery pack 10. The battery pack 10 includes battery cells having a lithium-cobalt (Li—Co), lithium-manganese (Li—Mn), Li—Mn spinel, or other suitable lithium-based chemistry. Alternatively, the battery pack 10 has, for example, a nickel-metal hydride (NIMH) or nickel-cadmium (NiCd) based chemistry. The battery pack 10 has a nominal voltage rating of 4V, 8V, 12V, 16V, 18V, 20V, 24V, 36V, 48V, or other voltage rating therebetween or greater than 48V. Of course the size and shape of the battery pack may vary depending on the characteristics of the battery pack and/or battery cells within the battery pack. For example, FIG. 4 shows a second battery pack 10b. The size and shape of the shown battery pack 10 is exemplary and is show as a removable battery pack.

The battery pack 10 includes a housing 15. A latch 50 is extendable, movably mounted to the housing 15, and configured to be moved from a first position (e.g., a latched position) to a second position (e.g., an unlatched position) by the movement of a lever. While in the latched position, the latch 50 securely couples the battery pack 10 to a power tool. The movement of the latch 50 from the first position to the second position allows the battery pack 10 to be removed from the power tool.

Figure 2:
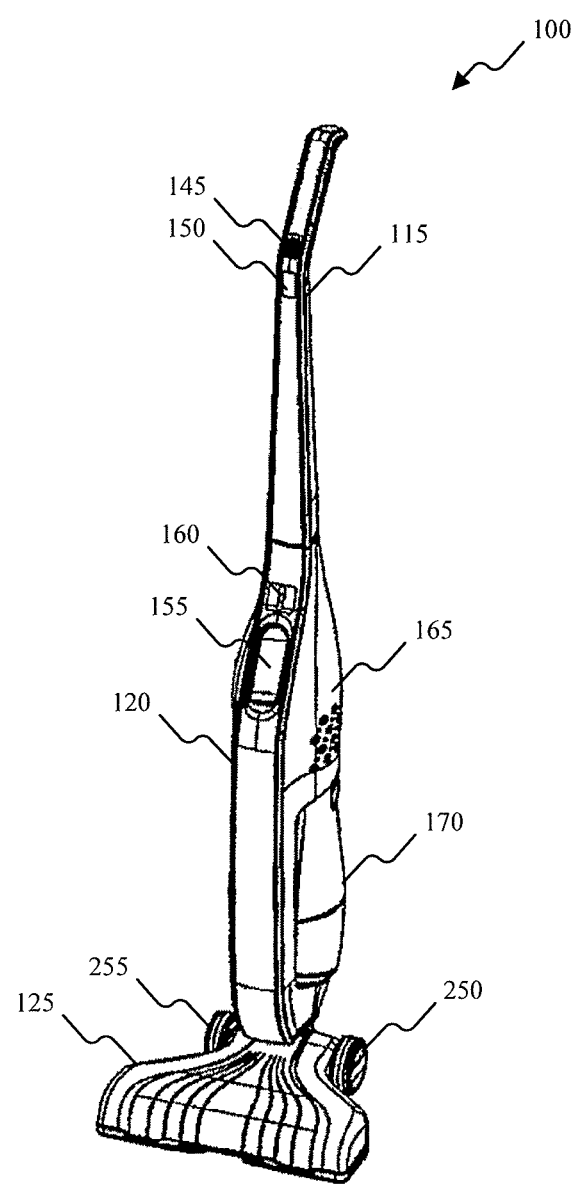
FIG. 2 illustrates a perspective view of a cleaning system.

The battery pack 10 further includes an electrical interface 55. Electrical communication and power to and from the battery pack 10 are made through the electrical interface 55. The electrical interface 55 includes electrical connectors 60. The electrical interface 55 can vary in the number of electrical connectors 60. While three electrical connectors are shown in FIG. 2, other constructions in some of the other figures include a different number of electrical connectors. For example, FIG. 4 shows four electrical connectors.

Figure 3:
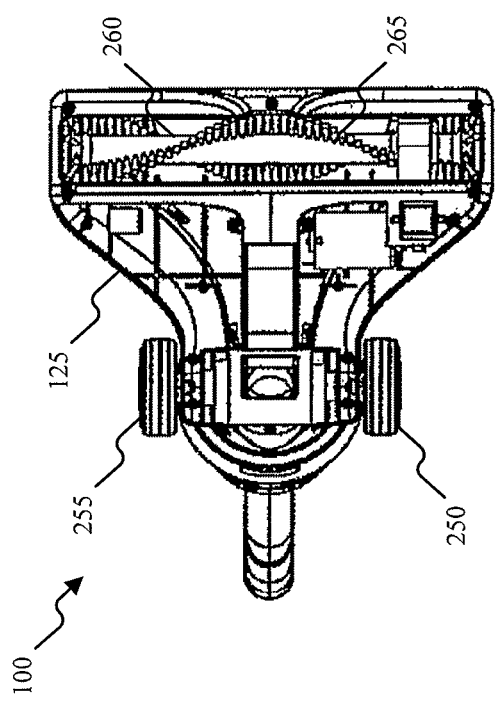
FIG. 3 illustrates a bottom view of the cleaning system of FIG. 2.

FIGS. 2 and 3 illustrate a suction force cleaning system 100 powered by the battery pack 10. The cleaning system 100 is illustrated as an upright vacuum cleaner. However, in other constructions, the cleaning system 100 can be a stick-type vacuum, a handheld vacuum, a carpet cleaner, a backpack vacuum, or the like. Embodiments of the invention can also be implemented in other power tools.

The shown cleaning system 100 includes a handle portion 115, and a body portion 120. The handle portion 115 includes one or more user-controlled switches 145 and a plurality of indicators 150. In one construction, the user-controlled switch 145 is a three-position switch. In another construction, there are multiple two-position user-controlled switches. The plurality of indicators 150 provide indications to a user related to the operational mode of the cleaning system 100. In some constructions, the plurality of indicators 150 is light emitting diodes (LEDs).

The body portion 120 includes a battery receptacle 155, a fuel gauge 160, a motor/fan assembly 165, and a refuse chamber 170. The battery receptacle 155 receives the battery pack 10. The battery receptacle 155 includes a plurality of electrical connectors for electrically connecting the battery pack 10 to the cleaning system 100. The fuel gauge 160 is configured to provide an indication to the user of the voltage or charge level of the battery pack 10 inserted into the battery receptacle 155. The motor/fan assembly 165 is positioned below the battery receptacle 155. The motor/fan assembly 165 includes a first motor 166 (FIG. 6) and an air mover, such as a blower or a fan. In some constructions, the first motor 166 is a brushless direct-current (BLDC) motor. In other constructions, the first motor 166 can be a variety of other types of motors, including but not limited to, a brush DC motor, a stepper motor, a synchronous motor, or other DC or AC motors.

The refuse chamber 170 is positioned below the motor/fan assembly 165, and is removably coupled to the body portion 120. The refuse chamber 170 further includes an inlet for receiving refuse.

Figure 6:
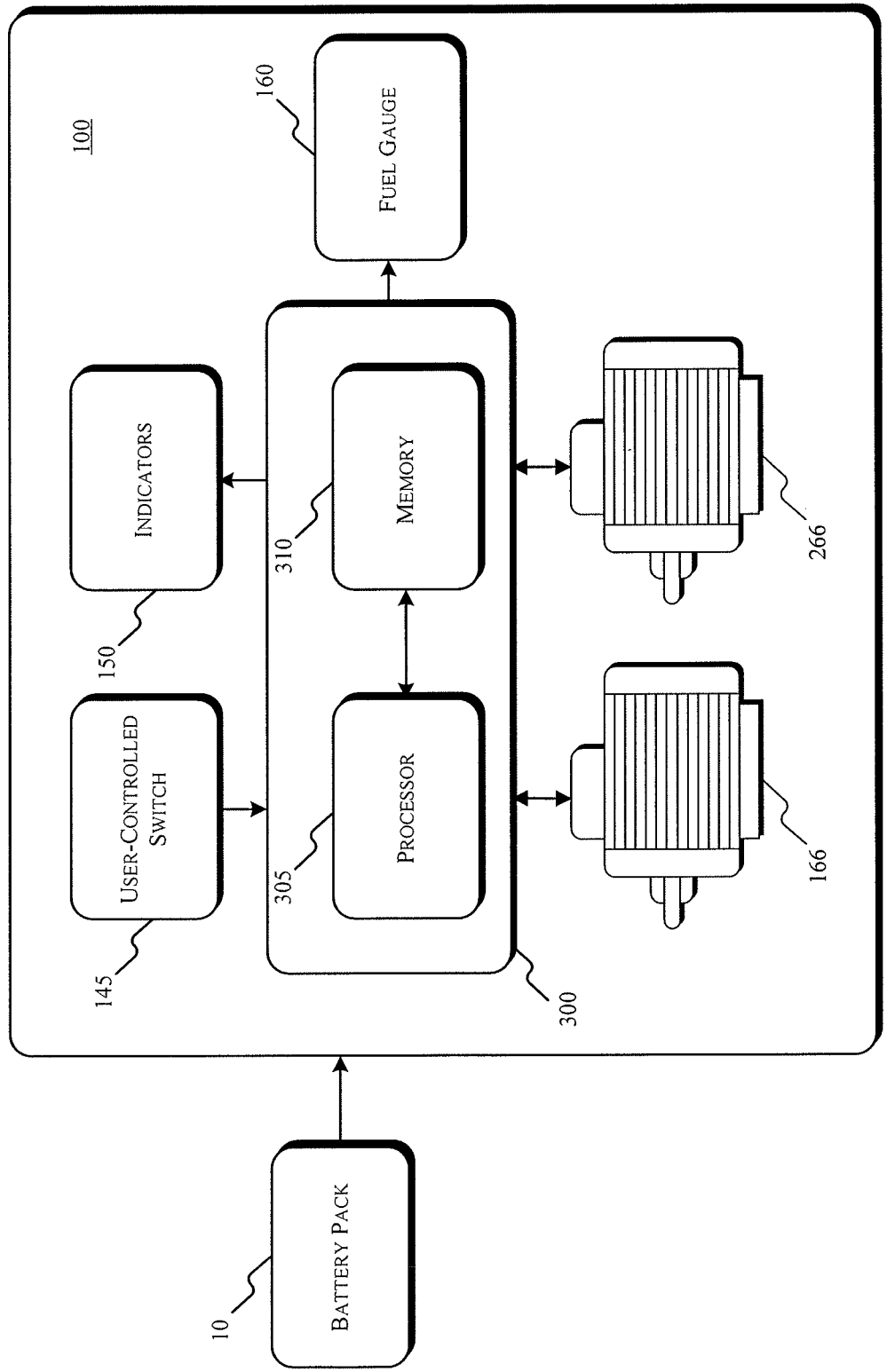
FIG. 6 is a first block diagram for the electrical components capable of being used in the cleaning systems of FIGS. 2 and 5.

The base portion 125 includes a first wheel 250, a second wheel 255, a suction inlet 260, an agitator, such as a brush 265, and a second motor 266 (FIG. 6). The suction inlet 260 allows refuse to enter into the cleaning system 100.

The second motor 266 rotates the brush 265. In some constructions, the second motor 266 is a brushless direct-current (BLDC) motor. In other constructions, the motor can be a variety of other types of motors, including but not limited to, a brush DC motor, a stepper motor, a synchronous motor, or other DC or AC motors.

Figure 5:
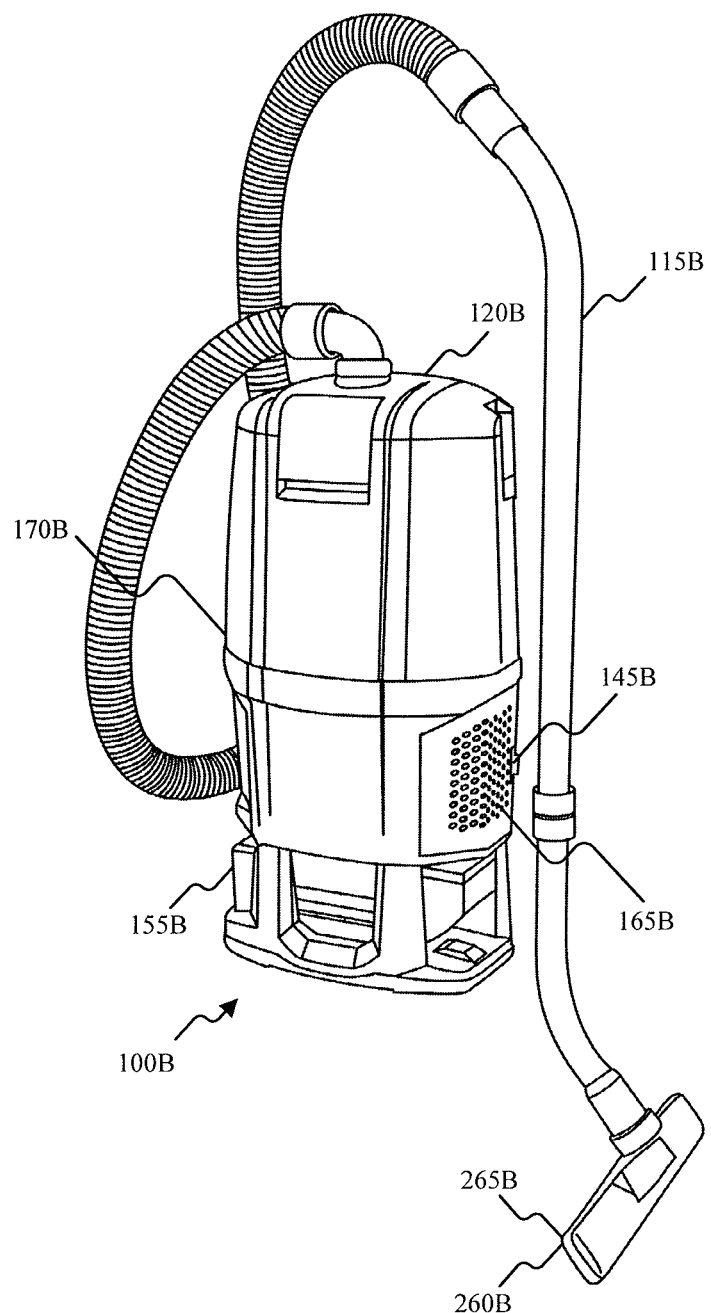
FIG. 5 illustrates a perspective view of a second cleaning system.

Before proceeding further, one skilled in the art would understand that the layout and arrangement of the mechanical construction of the cleaning system 100 can vary from what is shown and described thus far. For example, the construction of the cleaning system 100 varies greatly if the cleaning system is in the form of a backpack vacuum cleaner. FIGS. 4 and 5 show a battery pack and backpack vacuum cleaner with like components labeled with the reference "b". The shown constructions in FIGS. 1-5 are exemplary and are meant for providing context for some of the components discussed in further detail below.

The cleaning system 100 further includes a controller 300, shown in FIG. 6. The controller 300 is electrically and/or communicatively connected to a variety of modules or components of the cleaning system 100. For example, the controller 300 is connected to the user-controlled switch 145, indicators 150, the fuel gauge 160, the suction motor 166, and the brush motor 266. The controller 300 receives power from the battery pack 10. The controller 300 includes combinations of hardware and software that are operable to, among other things, control the operation of the cleaning system 100.

In some constructions, the controller 300 includes a plurality of electrical and electronic components that provide power, operational control, and protection to the components and modules within the controller 300 and cleaning system 100. For operational control, the controller 300 can include, among other things, a processor 305 (e.g., a microprocessor, a microcontroller, or another suitable programmable device) and a memory 310.

The memory 310 includes, for example, a program storage and a data storage. The program storage and the data storage can include combinations of different types of memory, such as read-only memory (ROM), random access memory (RAM) (e.g., dynamic RAM [DRAM], synchronous DRAM [SDRAM], etc.), electrically erasable programmable read-only memory (EEPROM), flash memory, a hard disk, an SD card, or other suitable magnetic, optical, physical, or electronic memory devices. The processor 305 is connected to the memory 310 and executes software instructions that are capable of being stored in a RAM of the memory 310 (e.g., during execution), a ROM of the memory 310 (e.g., on a generally permanent basis), or another non-transitory computer readable medium such as another memory or a disc. Software included in the implementation of the cleaning system 100 can be stored in the memory 310 of the controller 300. The software includes, for example, firmware, one or more applications, program data, filters, rules, one or more program modules, and other executable instructions. The controller 300 is configured to retrieve from memory and execute, among other things, instructions related to the control processes and methods described herein.

Figure 7:
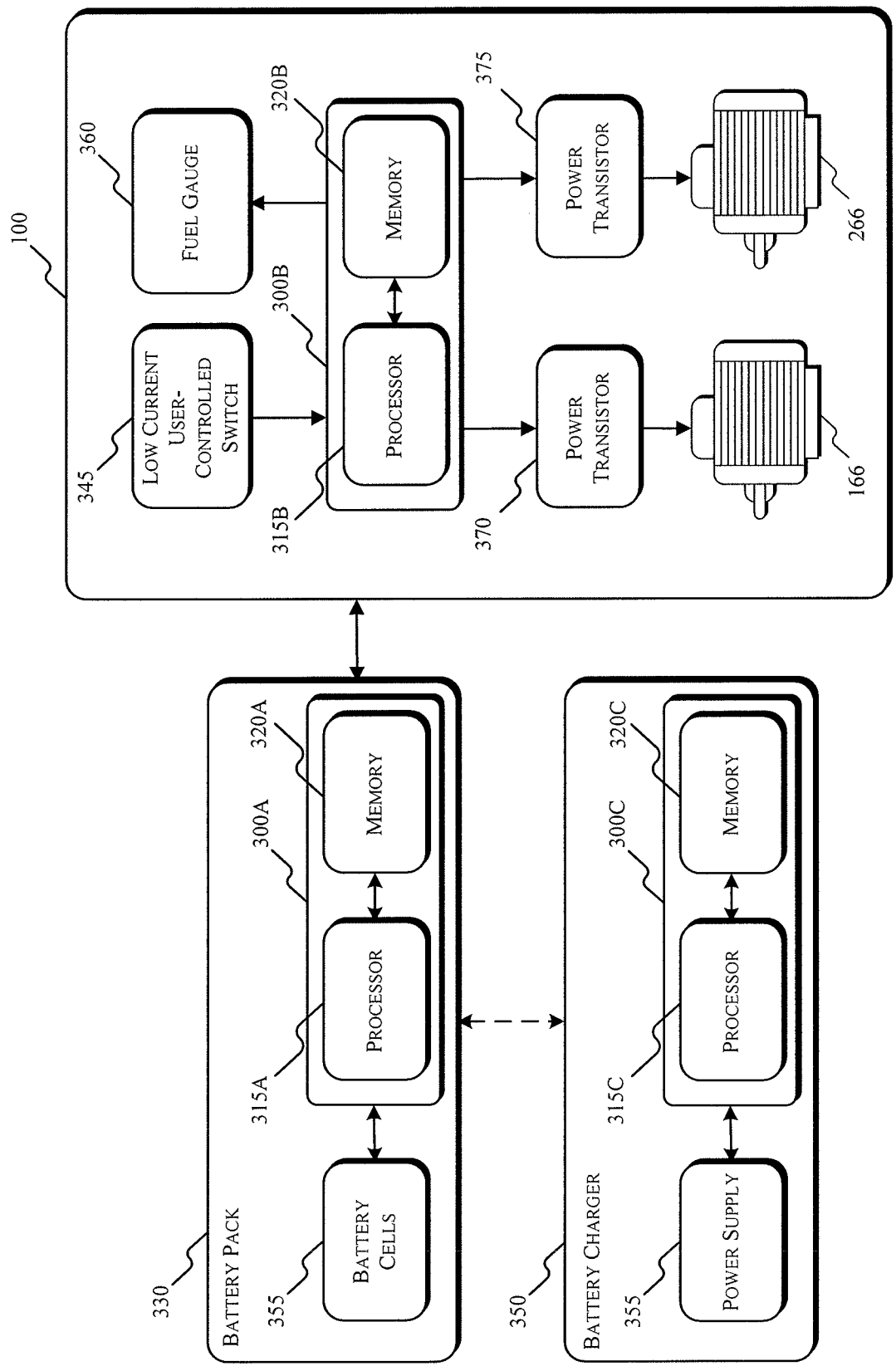
FIG. 7 is a second block diagram for the electrical components capable of being used in the cleaning systems of FIGS. 2 and 5.

In other constructions, the controller 300 includes additional, fewer, or different components. In some constructions, as illustrated in FIG. 7, the functionality of the controller 300 is performed by multiple controllers 300A and 300B having multiple processors 315A and 315B and memories 320A and 320B. The controller 300 may be distributed among different components, such as the cleaning system 100 and the battery pack 330. Also, a battery charger 350 may include a processor 315C and memory 320C as shown in FIG. 7. The processor and memory may be constructed similar to the processor 315 and memory 320 discussed above.

The cleaning system 100, including the battery pack 330 and the battery charger 350, can use the processors 315A, 315B, and 315C and other circuitry to manage and control the battery pack 300, the cleaning system 100, and the battery charger 350. The battery pack 330 also includes the battery cells 335. The battery charger 350 includes at least one power supply 355 to charge at least one battery pack 330.

The cleaning system 100 shown in FIG. 7 uses a user-controlled switch 345 to control the suction motor 166 and the brush motor 266 via the processor 315B of the cleaning system controller 300B. The user-controlled switch 345, as will be discussed further below, is a low current switch. The processor 300B operates the suction motor 166 and the brush motor 266 using power transistors 370 and 375.

The controller 300 A, B, and/or C (which may also be collectively referred to hereinafter as controller 300) calculates, or determines, the voltage of the battery pack 330. The controller 300B then outputs a signal indicative of the voltage, or charge level, to the fuel gauge 360 to be displayed to the user. The controller 300B also receives signals from the user-controlled switch 345.

The controller 300B operates the suction motor 166 and the brush motor 266. In some examples, the controller 300B operates the suction motor 166, and the brush motor 266 by use of pulse-width modulated (PWM) signals. The PWM signals may be provided by the power transistors 370 and 375 for controlling suction motor 166 and brush motor 266.

Referring back to FIG. 1, the electrical connections 60 of the electrical interface 55 of the battery pack 10 includes a positive voltage terminal (+BAT or BAT+) and a negative high current power supply terminal (−BAT or BAT−). As discussed in connection with FIG. 1, the number of electrical connections 60 can vary. Along with the positive voltage terminal (+BAT) (1A and 1B on J5 in FIG. 8A) and the negative high current power supply terminal (−BAT) (4A and 4B on J5 in FIG. 8A), the electrical interface 55 can also include a low current power supply terminal (COMM−) (3A and 3B on J5 in FIG. 8A). The low current power supply terminal (COMM−) provides a substantially continuous power connection from the battery pack 330 to the cleaning system 100. The electrical interface 55 can also include a serial data communication line (SDL) terminal (2A and 2B on J5 in FIG. 8A) used to communicate between controllers, such as between the controller 300A (including the processor 315A) for the battery pack 330 and the controller 300B (including the processor 315B) for the cleaning system 100, or the controller 300C (including the processor 315C) for the battery charger 350. The serial data communication line terminal (SDL) supports a control and/or data signal used between processors 315A-C.

Figure 8A:
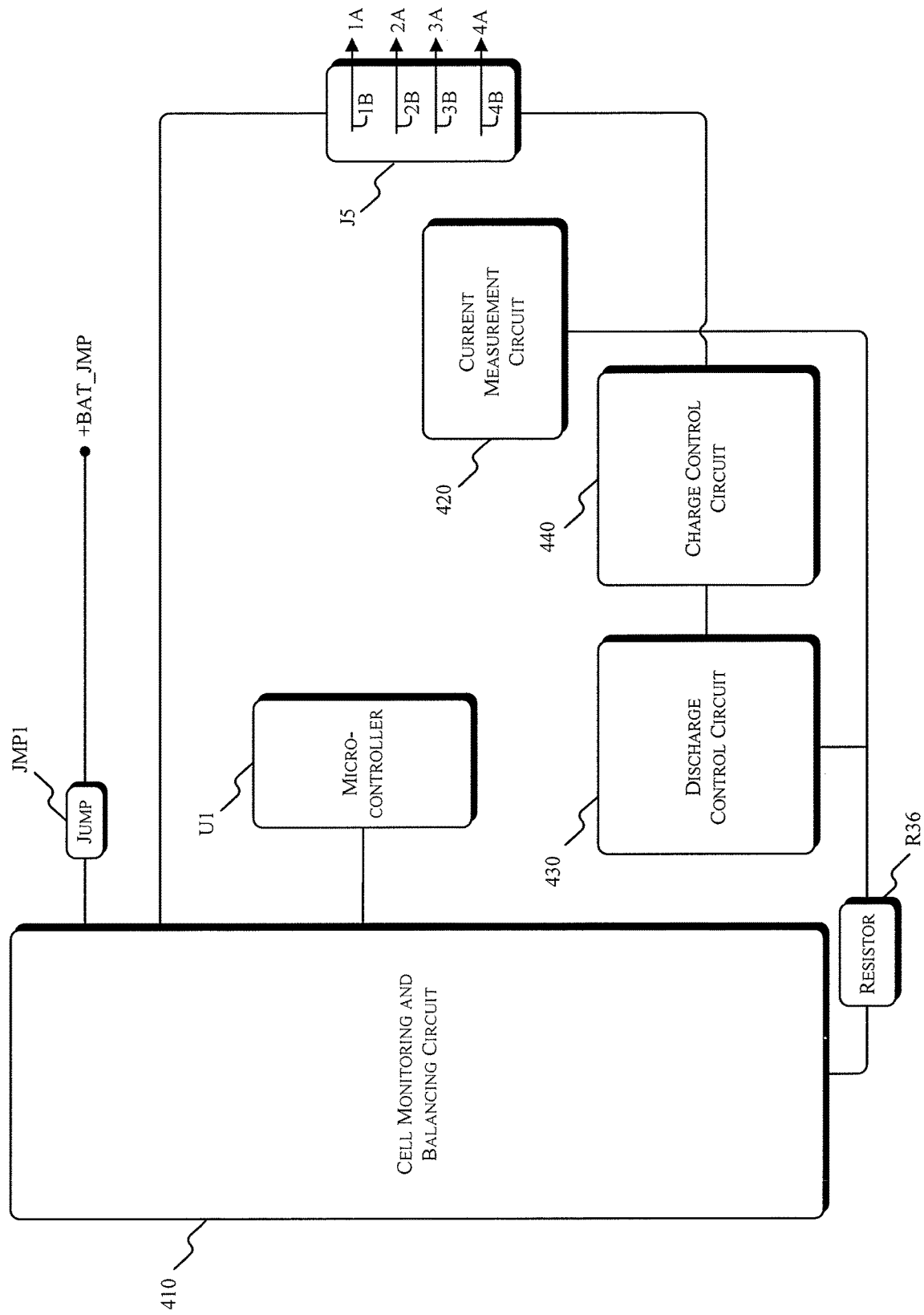
FIGS. 8A, 8B, 8C, and 8D are electrical schematics of a battery pack capable of being used in the cleaning systems of FIGS. 2 and 5.

The cleaning system 100 includes an electrical connector corresponding to the junction J5 of FIG. 8A. More specifically, FIG. 9A includes junction J3, with terminals 1A, 1B, 2A, 2B, 3A, 3B, 4A, and 4B which correspond to junction J5 of FIG. 8A.

The low current power supply terminal (COMM−) has a peak current less than 500 milliamperes (mA). In some examples, the low current power supply terminal (COMM−) has a peak current that less than 100 mA. In some examples, the low current power supply terminal (COMM−) has a peak current that is less than one-fortieth (1/40) of a peak current from the negative high current power supply terminal (BAT−). In other examples, the low current power supply terminal (COMM−) has a peak current that is less than one-hundredth (1/100) of the peak current from the negative high current power supply terminal (BAT−). For example, if the battery pack 330 has a peak current rating of 20 amps, the low current power supply terminal COMM− provides a peak current less than 200 mA.

Again, in normal operating conditions, the low current power supply terminal (COMM−) makes a small amount of continuous power available to the cleaning system 100. The low current power supply terminal (COMM−) can power a controller (e.g., a microcontroller), light emitting diode (LED) indicators, or other low power circuitry. The low current power supply terminal (COMM−) makes power available to the cleaning system 100 without the user activating or turning on the cleaning system 100.

Providing the low current power supply terminal (COMM−) can allow for the reduction of components and wiring associated with the cleaning system 100. In a conventional cleaning system, for example, the user-controlled switch (analogous to switch 145) can turn on the load, such as a motor, with high voltages (e.g., greater than 18 volts)

and high currents (e.g., greater than 5 amps). In some examples, the peak voltage can be greater than 32 volts. In some examples, the peak currents can be 20 amps. High voltage and/or high current wiring has relatively large diameter wire, such as 14 gauge, 12 gauge, or 10 gauge wire, routed within the cleaning system 100 from the battery pack 10 to the user-controlled switch 145 back to the motors (e.g., the suction motor 166 or the brush motor 266). Switches and wiring that handle high voltages and high current are relatively expensive (compared to low current switches and wiring) and can increase the cost of the cleaning system 100.

The switch 345 used to turn on the motors 166 and 266 can provide a low current signal to the controller 300B (e.g., processor 315B) and the controller 300B can control the motors 166 and 266 either directly or indirectly. The wiring between the switch 325 and the controller 300B can be relatively small diameter wire, such as 16 gauge, 18 gauge, or 20 gauge wire, used for low current applications. As a result, the low-current user-controlled switch 345 and related wire can be considerably cheaper than a high-current user-controlled switch that powers the load (e.g., motors) directly.

Figure 9A:
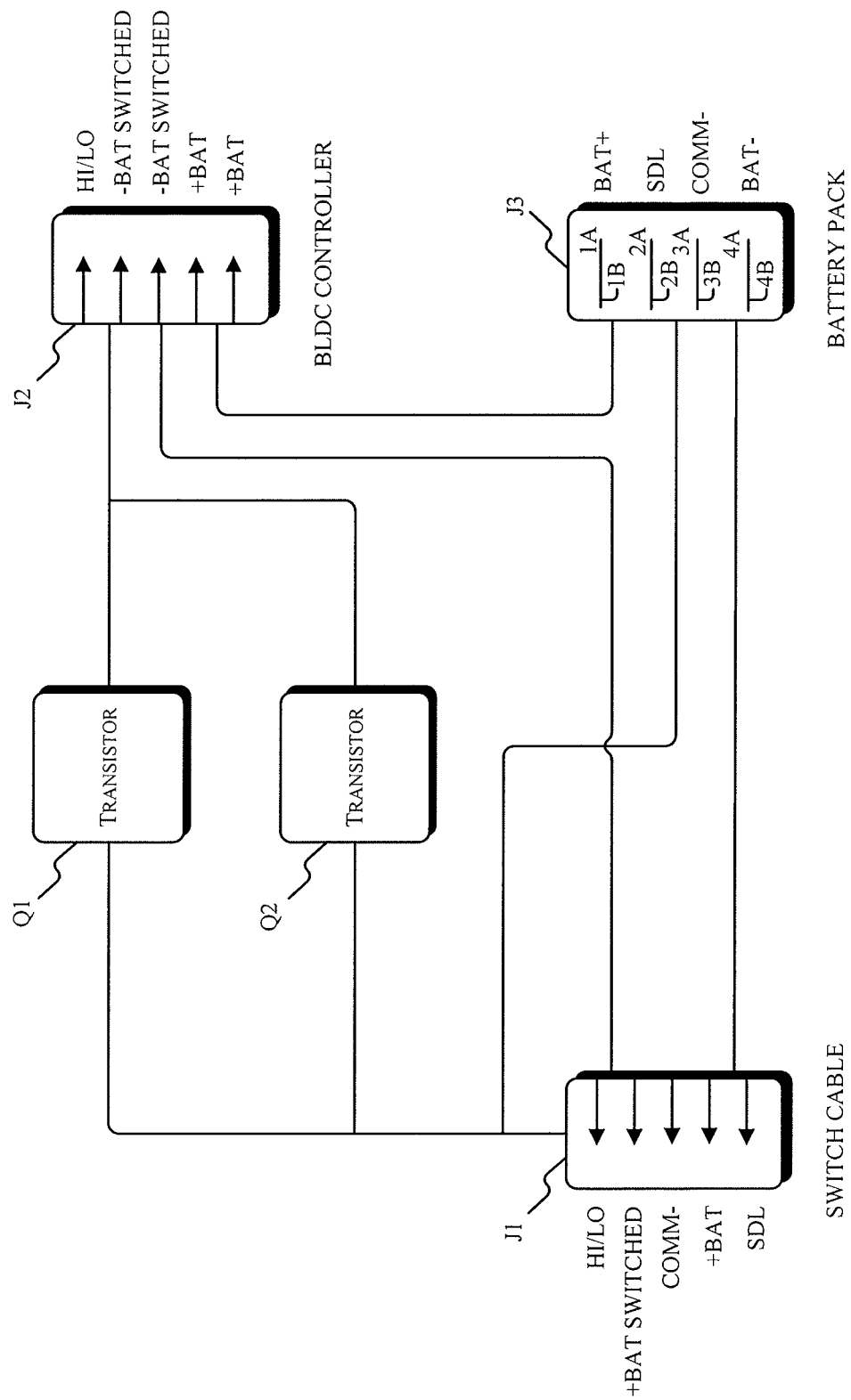
FIGS. 9A, 9B, 9C, and 9D are electrical schematics of the cleaning system of FIG. 5.

FIG. 9A shows junction J3 having a positive voltage terminal (BAT+), a negative high current power supply terminal (BAT-), a low current power supply terminal (COMM-), and a serial data communication line (SDL) terminal. The positive voltage terminal (BAT+) and the low current power supply terminal (COMM-), among other terminals, are connected to a switch cable by junction J1. The switch cable connects to junction J1 of FIG. 9B. The circuit shown in FIG. 9B includes microcontroller U1, which generally correspond to the processor 315B and memory 320 of FIG. 7. The switch S1 generally corresponds to the low voltage switch 345 of FIG. 7.

The switch S1 is a three position switch with HI, LO, and OFF positions. The positive voltage line (BAT+) and the low current power supply line (COMM-) provide supply voltage to the voltage regulator 400 and provide nominal or ground, respectively. The voltage regulator 400 provides substantially continuous low voltage VDD (e.g., +3.3V), and the low current power supply line (COMM-) provides VSS (0V nominal or ground [GND]) for the microprocessor U1. Because the current draw of the voltage regulator 400 is small, smaller diameter wiring can be used between the cable junction J1 of FIG. 9A and the junction J1 of FIG. 9B. Also, a low current user-controlled switch 345 can be used.

When the cleaning system 100 is coupled to the battery pack 330, and the cleaning system 100 is not operational (i.e., the motors 166 and/or 266 are not running), the microprocessor U1 is in a low power mode or sleep mode. When the switch S1 is manually turned on (i.e., in a HI or LO position) by a user, a signal is generated to wake up the microprocessor U1 from the low power mode. In addition to generating a signal to wake up the microprocessor U1, the switch S1 generates a low current signal on the +BAT_SWITCHED line to turn on one or more FETs Q1 and Q2 (shown in FIG. 9A), discussed further below.

When the microcontroller U1 is connected to the cleaning system 100, the low current power supply terminal (COMM-) creates a current path for powering the microcontroller U1. Upon being powered, the microcontroller U1 can flash one or more of the LEDs, LED1, LED2, and/or LED3. This informs the user that a connection has been made. Other functionality similar to the flashing of the LED can be included. It is also envisioned that making the low current power line (COMM-) available allows for other user interfaces, such as a capacitive touch control user interface.

Figure 9B:
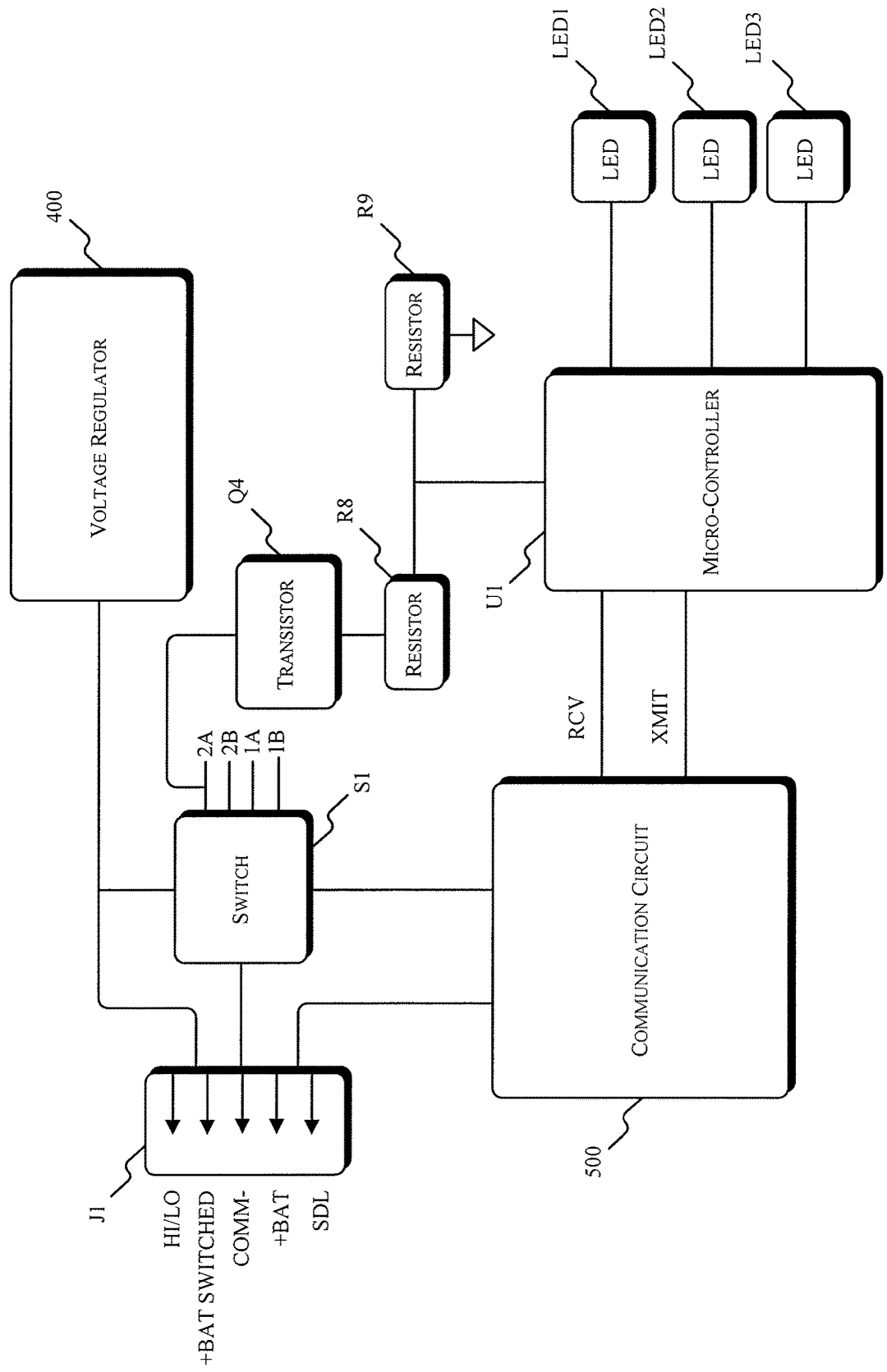

In the shown construction, the switch S1 is a three position switch, such as a three position rocker switch. Normally the switch S1 is in an OFF position. The user can move the switch S1 into a high mode or low mode for operating. In either of those two modes, contact is made to a set of contacts labeled 2A or 2B, which are tied together. The result is that the positive voltage terminal +BAT from J1 (FIG. 9B) is coupled to the +BAT_SWITCHED terminal of J1 (FIG. 9B). The +BAT_SWITCHED signal leads to the FET switch circuit of FIG. 9A. With reference to FIG. 9A, the signal on the +BAT_SWITCHED terminal turns the FET network (Q1 and Q2) conducting, thereby passing the signal to the BLDC controller junction J2.

Figure 9C:
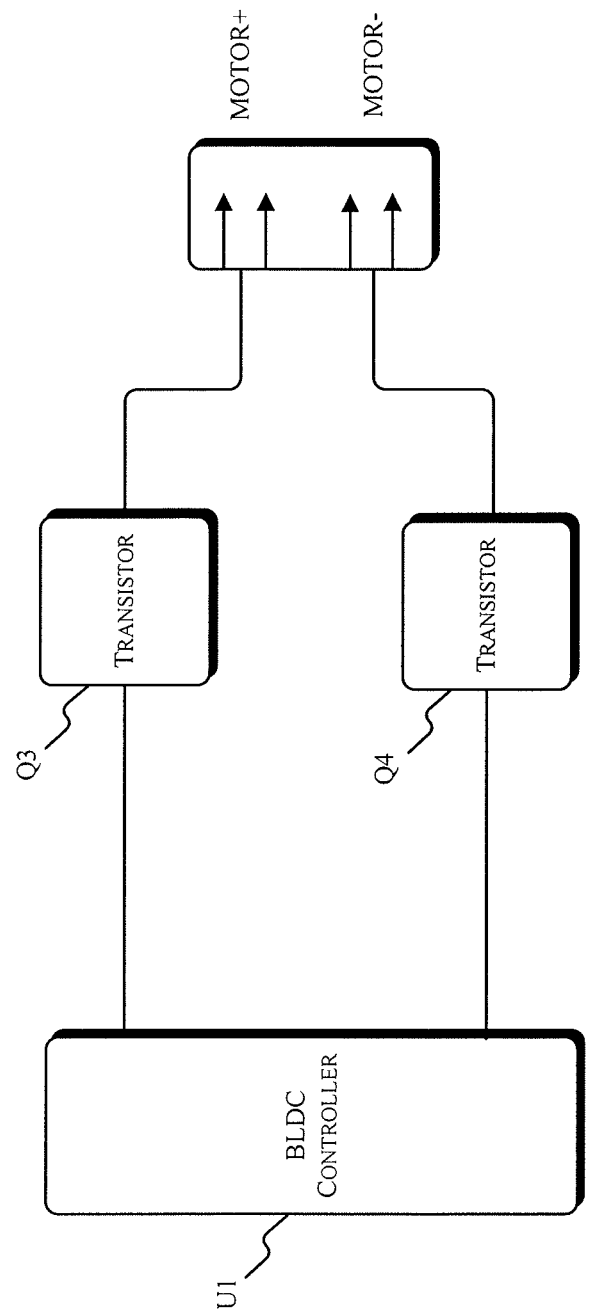

Referring back to FIG. 9B, when the user moves switch S1, contact is also made with contacts 1A or 1B. The result is that a control signal from the switch S1 is provided on the HI/LO operation terminal of J1. This signal also leads to the switch cable J1 of FIG. 9A. With reference to FIG. 9A, the HI/LO signal passes through the circuit of FIG. 9A to the BLDC controller junction J2. With the voltage and signals at junction J2, a BLDC controller (U1 of FIG. 9C) can control the power transistors 370 and 375 (Q3 and Q4 of FIG. 9C) accordingly. For example, if the user moves the switch to HI, the BLDC controller can control both motors 166 and 266 with PWM control. If the user moves the switch to LO, in one operation, the BLDC controller can control only the suction motor 166, while keeping the brush motor 244 off. Of course, other operation is possible based on the state of the switch S1 or if other user interfaces are used. Also, it is envisioned that the BLDC controller can use other information obtained directly or indirectly from the state of the battery pack 330 for the PWM control of the motors 166 and/or 266. For example, the battery pack voltage can be used as part of the PWM control. The PWM control can also be modified based on the loads applied to the motors 166 and/or 266, as is known in the art.

Referring back to FIG. 9B, simultaneous to signals being communicated to the BLDC controller, the signal communicated on +BAT_SWITCHED couples through transistor Q4 when the user moves switch S1. The circuit including transistor Q4 provides a current limited flow through resistors R8 and R9. The result is a wake up signal for the microcontroller U1. That is, whenever a user moves the switch to high or low, the connection wakes up the microcontroller U1. If the input has been valid for a time period, the microcontroller U1 output a signal on the line labeled XMIT. The signal XMIT turns on the collector of Q3, which is tied into the SDL line. This provides a signal back to the battery pack 330. The signal on the SDL line wakes up the controller 300A. The microcontroller U1 of FIG. 9B will hold that line active for a time period. If the input on the SDL is valid for a time period, the controller 300A determines that a call for power is being requested of the pack 330. The controller 300A wakes up and confirms the battery pack 330 can provide power. For example, the controller 300A can check the cell temperature, cell voltages, and pack voltage.

After the microcontroller U1 has activated the SDL line for a time period, the microcontroller U1 turns the transistor Q3 off (see FIG. 9D) and waits for receiving data. When the controller 300A finishes checking the status of the battery pack 330, the controller 300A can provide a signal back to the microcontroller U1. The controller 300A and the microcontroller U1 perform handshaking communication to confirm they can communicate with each other. The microcontroller U1 confirms and sends back a message to the controller 300A to start power. Based on this communication, the controller 300A can close a power switch in the BAT− line of the battery pack 330. The closure of the power switch in the battery pack 330 creates a high current power supply from the battery pack 330 to the cleaning system 100, and specifically the BLDC controller (FIG. 9A). The controller 300A and the microcontroller U1 can continue to communicate with each other during operation of the motor 166 and/or motor 266. The cleaning system 100 continues to operate until either the user moves the switch 345 to the off position or the controller 300A identifies an issue (e.g., high temperature, low cell voltage, low pack voltage) with the battery pack 335. If the user moves the switch 345 to the OFF position, then the microcontroller U1 sends a message over the SDL line to the controller 300 to stop providing power. The controller 300A acknowledges the signal and opens the power switch in the BAT− line of the battery pack 330. The result of opening the power switch stops the high current power supply from being provided to the BLDC controller (FIG. 9A) and the motors 166 and 266.

With reference to FIG. 8A, microcontroller U1 provides cell and pack voltage monitoring, among other functions. +BAT_JMP is coupled to one of the cells through JMP1 on the battery control board. +BAT_JMP provides a high voltage (or high bus) for the battery pack 330. BAT+ couples to 1A and 1B on connector J5. The circuit 410 is used for monitoring the cell and pack voltages and for cell balancing. R36 is used with circuit 420 for monitoring pack current. The circuit 430 provides the power switches for discharging the battery pack 330. The circuit 440 includes the power switches for charging the cells. The microcontroller U4 of FIG. 8B, communicates with the microcontroller U1 of the cleaning system 100, controls the charge power switches with the circuit 420 and controls the discharge power switches with circuit 430.

Figure 8B:
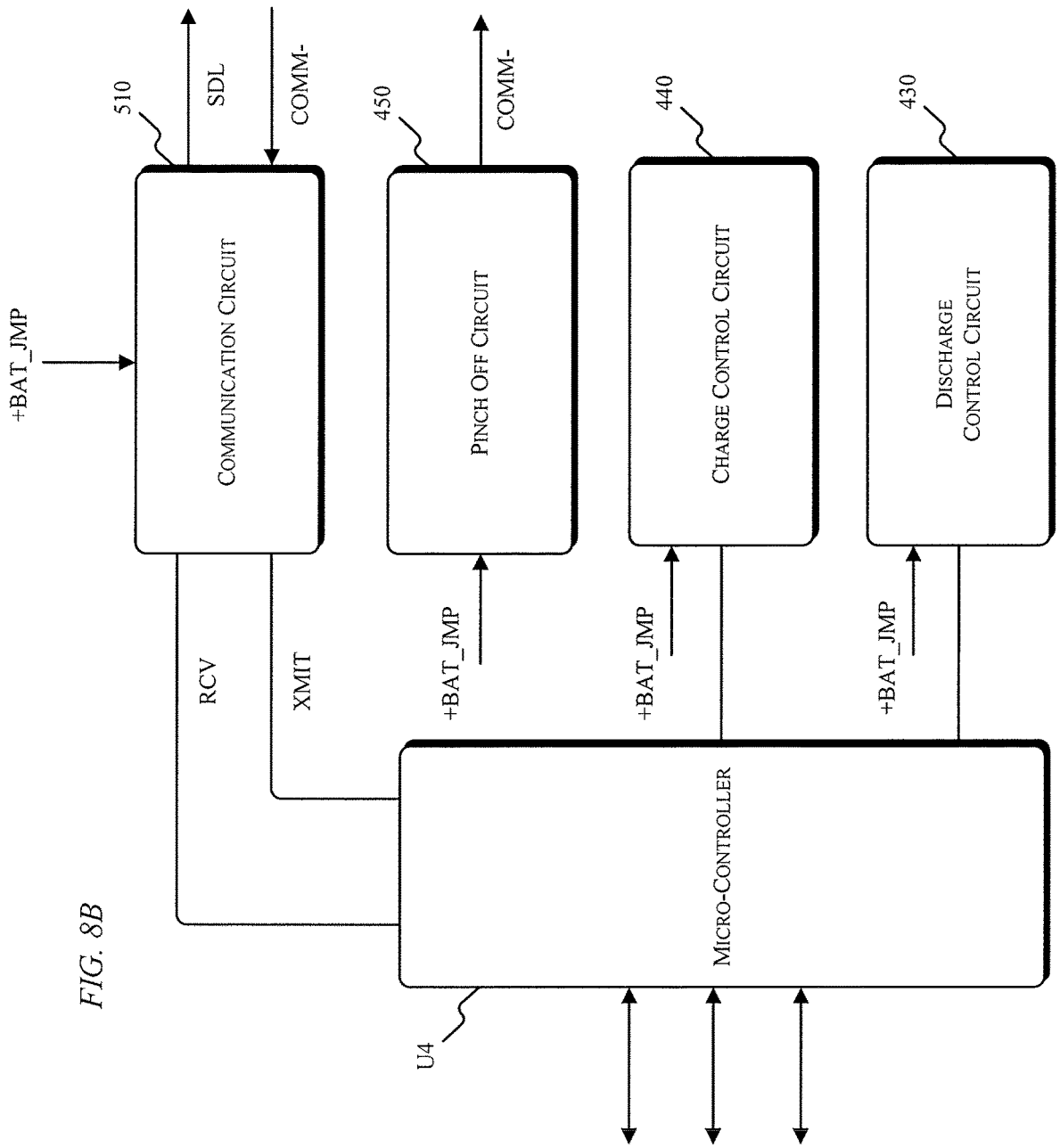

In FIGS. 8A and 8B, one skilled in the art will see that the low current power supply line (COMM−) is separate from the high current power supply line (BAT−). More specifically, the circuit 450 completes the circuit for low current power supply line (COMM−) to the positive voltage line (BAT+) via +BAT_JMP and jumper JMP1 (see FIG. 8C). Accordingly, the low current power supply terminal (COMM−) and the positive terminal (BAT+) make a substantially continuous low current circuit available without closing the power switches in high current power supply line (BAT−). That is, the current available via the low current power supply terminal (COMM−) is separate and apart from the charge and discharge current.

Figure 8C:
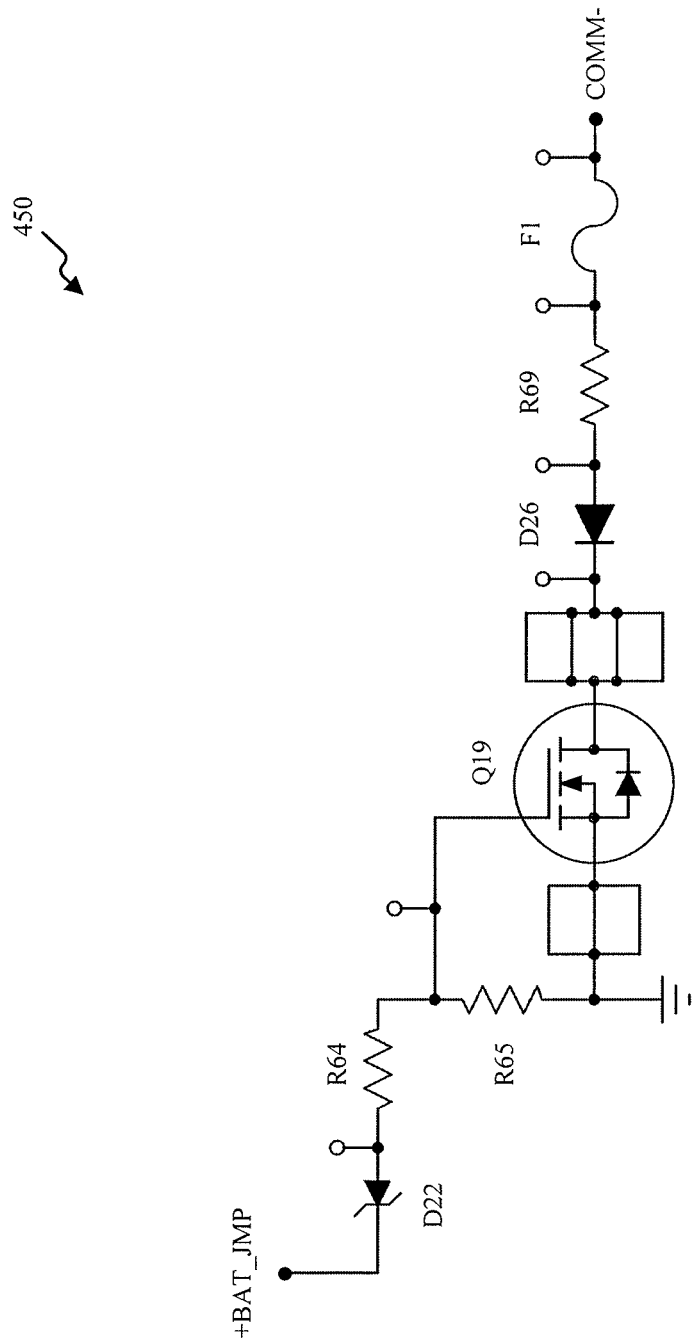

The circuit 450 includes a pinch off circuit for the low current power supply terminal (COMM−). As shown in FIG. 8C, the pinch off circuit includes fuse F1, resistor R69, diode D26, transistor Q19, resistors R64 and R65, and diode D22. The transistor Q19 acts as a switch to break the circuit to the low current power supply terminal (COMM−) when a monitored parameter (e.g., the battery pack voltage level) reaches a defined set point or threshold (e.g., a fault condition). The breaking of the circuit 450 prevents an over discharge of the battery pack 330. The diode D26 is a parasitic leakage path blocker that allows current to flow in one direction and prevent parasitic leakage in the other direction. As discussed, the low current power supply terminal (COMM−) is meant to be a low current draw. If a current draw is too large for a defined period, the voltage may over discharge the battery. The circuit with diode D22, resistors R64 and R65, in conjunction with transistor Q19, turns transistor Q19 off when the battery pack 330 discharges to a defined voltage.

With this design, the user controlled switch 345 cannot turn on the cleaning system 100 when the low current circuit 450 is not making a current available to the microcontroller U1 of FIG. 9B. This preserves enough voltage in the battery pack 330 without the battery pack 330 being completely discharged. A manufacturer would be able to service the battery pack 330 even though the battery pack 330 would not work with the cleaning system 100 or the battery charger 350. While a certain degree of service is required for the shown construction, the battery cells 335 are still viable since they haven't completely discharged.

The fuse F1 prevents a user from accidentally placing an improper load across the low current power supply terminal (COMM−) and positive terminal (BAT+). If a current surge happens, the fuse F1 will open. It is envisioned that a current sensor and a switch (e.g., FET Q19), can alternatively be controlled by the microcontroller U4 in response to the current sensor. The current sensor and controlled switch can be used in place of the fuse. This alternative arrangement would allow the microcontroller U4 to break the circuit with the switch and reconnected the circuit with the switch after a time period. Similarly, the microcontroller U4 could monitor the pack voltage and open the switch prior to the battery cells being discharged too far.

The controller 300B includes a first communication circuit 500 in FIG. 9B and the controller 300A includes a second communication circuit 510 in FIG. 8B. A similar circuit, not shown, to circuits 500 and 510 would be part of the controller 300C of the battery charger 350. The charging and discharging of the battery pack 330 (e.g., between 8 amps and 20 amps) is at a significant enough of a level to effect communication. The ground for the controllers 300A, 300B, and 300C are with respect to the battery cells 335. Given that the circuit elements are not lossless and the voltage differences between VSS and VDD (or operating voltages of the microcontrollers) may be 3.3 volts or less, the processors 315A, 315B, and 315C may have difficulties recognizing logic zero (0) from logic one (1). The first and second communication circuits 500 and 510 further delineate the logic zero (0) from logic one (1). Also, the inclusion of the first and second communication circuits 500 and 510 also allow microcontrollers having differing VDD values to communication with each other.

Referring to the microcontroller U1 of FIG. 9B, the microcontroller includes a transmit port XMIT and a receive port RCV. To transmit, the transmit XMIT line includes a circuit through resistor R13 and transistor Q3, and connects to the port labeled SDL in junction J1 (see FIG. 9D). Referring to the microcontroller U4 of FIG. 8B, the microcontroller U4 also includes a transmit port XMIT and a receive port RCV. To transmit, the transmit XMIT line includes a circuit through resistor R67 and transistor Q25, and connects to the port labeled SDL in junction J5 of FIG. 8A (see FIG. 8D). As is apparent, additional circuit elements may be present in the transmit path, but the general layout of the transmit paths are similar.

Figure 8D:
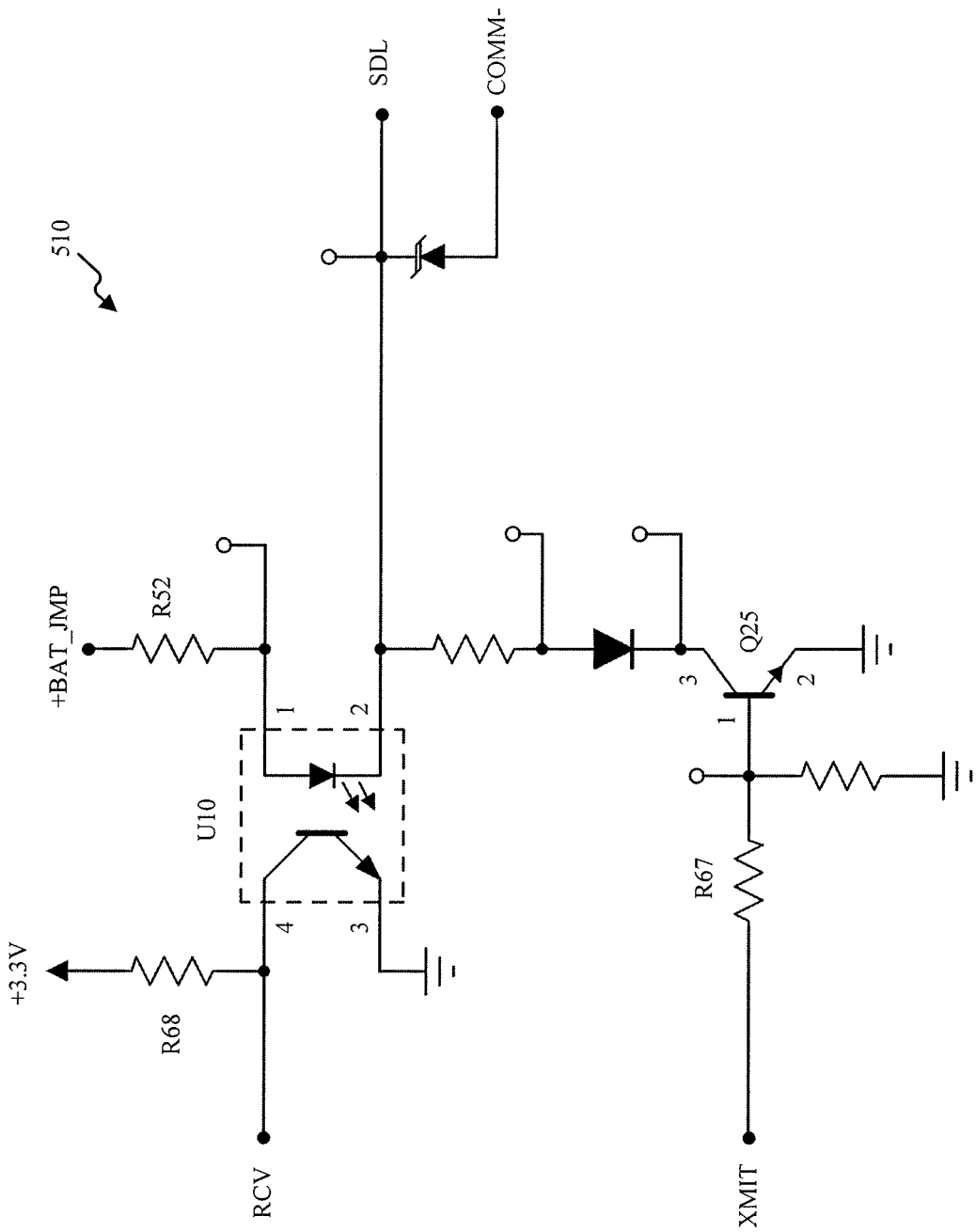
Figure 9D:
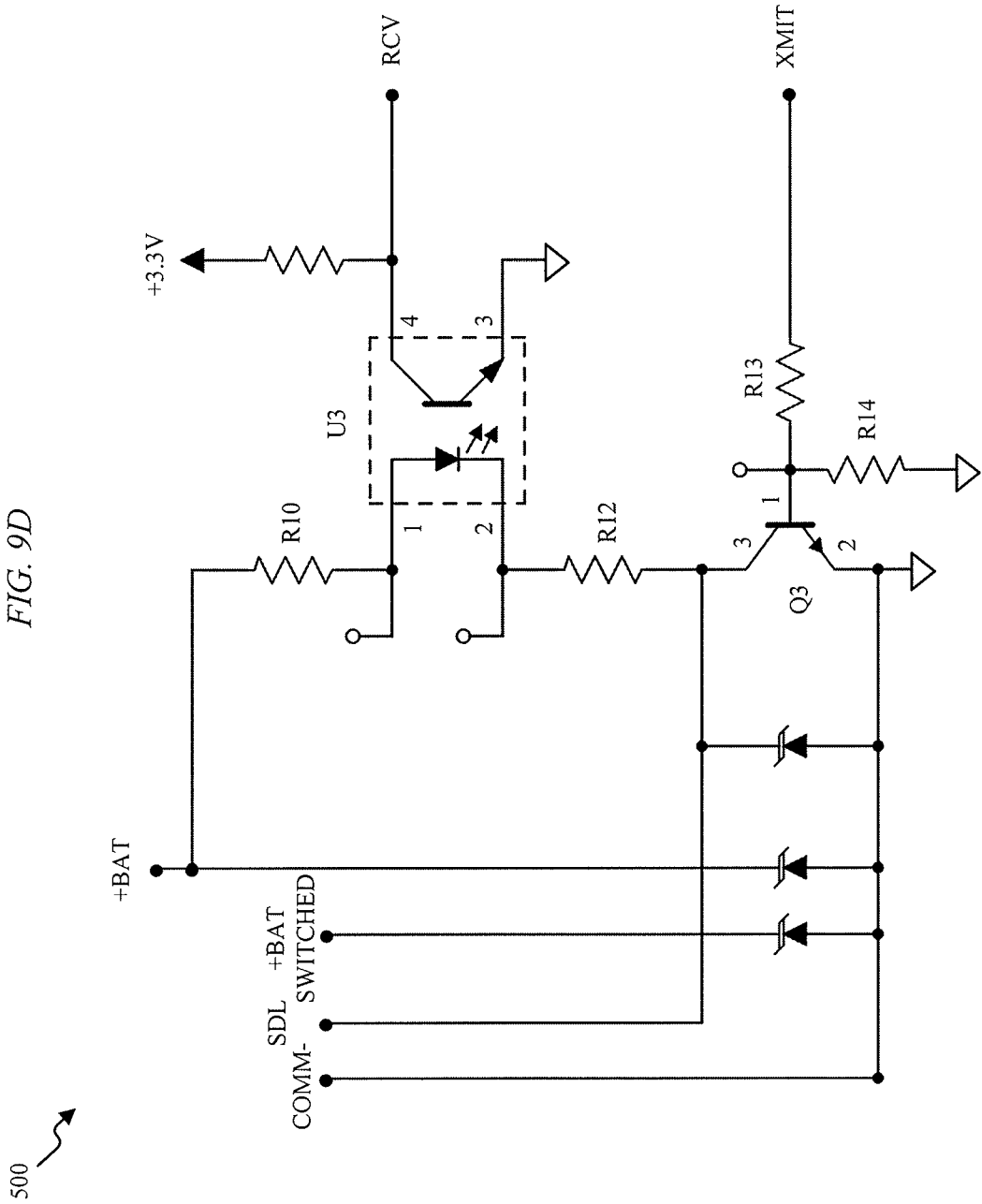

With reference to the transmit path XMIT of FIG. 9B and FIG. 9D, when the microcontroller U1 transmits a logic one (1), the transistor Q3 pulls current through the resistor R10, the LED of the optocoupler U3, and to ground. Similarly, the transistor Q3 pulls current through the resistor R52 and LED of the optocoupler U10 of FIG. 8D. The phototransistor of the optocoupler U10 conducts, pulling current through resistor R68 and optocoupler U10. The pulling of current through the optocoupler U10, results in a logic zero (0) being registered on the receive port RCV of microcontroller U4. Accordingly, a logic one (1) at the transmit port XMIT of microcontroller U1 of FIG. 9B results in a logic zero (0) at the receive port RCV of microcontroller U4 of FIG. 8B. The microcontrollers U1 and U4 are aware of this complimented transmission and one of the microcontrollers U1 or U4 can transpose the result according. Alternatively, an additional circuit can be added to the receive lines to transpose the result from the receive optocoupler. The transmit port XMIT of the microcontroller U4 and the receive port of the microcontroller U1 can operate similarly.

With reference again to the transmit path XMIT of FIG. 9B and FIG. 9D, when the microcontroller U1 transmits a logic zero (0), the transistor Q3 does not conduct and no current is pulled through the LED of the optocoupler U3. Similarly, the transistor Q3 does not pull current through the resistor R52 and LED of the optocoupler U10 of FIG. 8B. The phototransistor of the optocoupler U10 does not conduct, therefore no current is pulled through the phototransistor of the optocoupler U10. The result is a logic one (1) being registered on the receive port RCV of microcontroller U4. Accordingly, a logic zero (0) at the transmit port XMIT of microcontroller U1 of FIG. 9B results in a logic one (1) at the receive port RCV of microcontroller U4 of FIG. 8B. The microcontrollers U1 and U4 are aware of this complemented transmission and one of the microcontrollers U1 or U4 can transpose the result according. The transmit port XMIT of the microcontroller U4 and the receive port of the microcontroller U1 can operate similarly.

Referring back to FIG. 9D, as an example, the resistors R10 and R12 limit the current through the LED of the optocoupler U3 to a safe level. Likewise, resistor R13 limits the current through the base junction of the transistor Q3 to a safe level. Resistor R14 keeps the transistor Q3 turned off when a non-logic one (1) is being provided to the transistor Q3.

The inclusion of the transistors Q3 and Q25 and optocouplers U3 and U10, which are coupled to the positive high voltage path (+BAT) and ground path, i.e., the low current path (COMM−) in FIGS. 8D and 9D, allow a substantially delineated logic zero (0)/logic one (1) for the respective controllers 300A and 300B. The substantially high current through the battery pack 330 and cleaning system 100 doesn't affect the communication between microcontroller U1 and microcontroller U4.

An optocoupler, also called an optical isolator or photocoupler, is a component that transfers electrical signals between two isolated circuits by using light. Optocouplers prevent high voltages from affecting the system receiving the signal. A common type of optocoupler, which are shown as optocouplers U3 and U10, consist of a light-emitting diode (LED) and a phototransistor in the same opaque package. Other types of source-sensor combinations include LED-photodiode, LED-LASCR, and lamp-photoresistor pairs. The optocouplers U3 and U10 transfer digital on/off (or logic one/zero) signals. The LED of the optocouplers U3 and U10 is a two-lead semiconductor light source. The phototransistor is a two lead light-activated transistor that conducts in response to the light of the LED. While optocouplers U3 an U10 are shown, alternative isolators, such as radio frequency (RF) couplers can be used in place of the optocouplers U3 and U10.

Another detailed description for the communication circuits 500 and 510 is provided below. The terminology used below in reference to FIGS. 8D and 9D is not meant to be limited to FIGS. 8D and 9D. Rather FIGS. 8D and 9D are only one construction disclosing the below description.

Embodiments for portions of a battery pack 330 and a power tool combination 100 are shown in FIGS. 8D and 9D.

The battery pack 330 includes, with reference to FIG. 8D, a first voltage source +BAT_JMP, a second voltage source +3.3V, a first nominal voltage (ground), a first controller U4 (see FIG. 8B) having a first transmit terminal XMIT and a first receive terminal RCV, and a first communication circuit 510. The first communication circuit 510 has a first data terminal SDL, a first isolation coupler U10 including a first input terminal 1, a second input terminal 2, a first output terminal 4, and a second output terminal 3. The first communication circuit also has a first transistor switch Q25 including a first terminal 3, a second terminal 2, and a first control terminal 1. The first voltage source +BAT_JMP, the first input terminal 1 of the first isolation coupler U10, the second input terminal 2 of the first isolation coupler U10, the first terminal 3 of the first transistor switch Q25, the second terminal 2 of the first transistor switch Q25 and the first nominal voltage (ground) are electrically connected in a series configuration. The second voltage source 3.3V, the first output terminal 4 of the first isolation coupler U10, the second output terminal 3 of the first isolation coupler U10, and the first nominal voltage (ground) are electrically connected in a series configuration. The first transmit terminal XMIT of the first controller U4 is electrically connected to the first control terminal 1 of the first transistor switch Q25. The first receive terminal RCV of the first controller U4 is electrically connected to the first input terminal 4 of the first isolation coupler U10. The first data terminal SDL is electrically connected between the second input terminal 2 of the first isolation coupler U10 and the first terminal 3 of the first transistor switch Q25.

The power tool 100 having, as shown in FIG. 9D, a third voltage source +BAT, a fourth voltage source +3.3V, a second nominal voltage (common), a second controller U1 (see FIG. 9B) having a second transmit terminal 2 and a second receive terminal 3, and a second communication circuit 500. The second communication circuit 500 includes a second data terminal SDL, and a second isolation coupler U3 including a third input terminal 1, a fourth input terminal 2, a third output terminal 4, and a fourth output terminal 3. The second communication circuit includes a second transistor switch Q3 having a third terminal 3, a fourth terminal 2, and a second control terminal 1. The third voltage source +BAT, the third input terminal 1 of the second isolation coupler U3, the fourth input terminal 2 of the second isolation coupler U3, the third terminal 3 of the second transistor switch Q3, the fourth terminal 4 of the second transistor switch Q3, and the second nominal voltage (common) are electrically connected in a series configuration. The fourth voltage source 3.3V, the third output terminal 4 of the second isolation coupler U3, the fourth output terminal 3 of the second isolation coupler U4, and the second nominal voltage (common) are electrically connected in a series configuration. The second transmit terminal 3 of the second controller U1 is electrically connected to the second control terminal 1 of the second transistor switch Q3. The second receive terminal 2 of the second controller U1 is electrically connected to the third input terminal 4 of the second isolation coupler U3. The second data terminal SDL is electrically connected between the fourth input terminal 2 of the second isolation coupler U3 and the third terminal 3 of the second transistor switch Q3. The first data terminal and the second data terminal are electrically connected.

Thus, the invention provides, among other things, a new and useful battery pack and cleaning system and method of operating the same. Various features and advantages of the invention are set forth in the following claims.

What is claimed is:

1. A method of operating a power tool electrically connected to a battery pack, the method comprising:
   receiving a substantially continuous low current from a low current terminal of the battery pack;
   powering a microcontroller based on the substantially continuous low current;
   receiving, from a user interface of the power tool, an input related to the power tool performing a cleaning function;
   waking the microcontroller in response to the input;
   communicating, via a communication terminal, a signal to the battery pack to receive a high current from the battery pack; and
   receiving the high current from a high current terminal of the battery pack based on the signal.

2. The method of claim 1, wherein a peak of the high current is greater than 8 amps and a peak of the low current is less than 200 milliamps.

3. The method of claim 1, wherein the user interface includes a switch having multiple states, the multiple states including an off state and an on state, wherein the input related to the power tool performing the cleaning function is in response to the switch being moved to the on state.

4. The method of claim 1, further comprising performing a handshaking function between the microcontroller and the battery pack after waking the microcontroller and before communicating the signal.

5. The method of claim 1, wherein the power tool is a suction force cleaning device.

6. A method of operating a power tool electrically connected to a battery pack, the method comprising:
   receiving a first current from a low current terminal of the battery pack;
   powering a controller of the power tool using the first current, the controller operable in a sleep mode and a wake mode;
   operating the controller in the sleep mode;
   receiving, from a user interface of the power tool, an input related to the power tool powering a motor;
   operating the controller in the wake mode in response to the input;
   sending a signal, via a communication terminal, to the battery pack related to receiving a second current from the battery pack when operating the controller in the wake mode; and
   receiving the second current from a high current terminal of the battery pack based on the signal.

7. The method of claim 6, wherein the first current is substantially continuous.

8. The method of claim 7, wherein the first current is less than 200 milliamps.

9. The method of claim 6, wherein the second current is greater than 8 amps.

10. The method of claim 9, wherein the power tool is a suction force cleaning device.

11. The method of claim 6, further comprising connecting a first wire between the user interface and the controller for receiving the first current, wherein the first wire is a 16-gauge wire or smaller.

12. The method of claim 11, further comprising connecting a second wire between the battery pack and the motor for receiving the second current, wherein the second wire is a 14-gauge wire or larger.

13. The method of claim 6, further comprising controlling a first battery pack switch to stop the second current when a voltage of one or more battery cells in the battery pack reaches a low voltage threshold.

14. The method of claim 13, further comprising controlling a second battery pack switch to stop the first current when the voltage of the one or more battery cells in the battery pack reaches a low voltage threshold.

15. The method of claim 6, wherein the controller of the power tool is powered by the first current when the power tool is in an OFF state.

* * * * *